W. P. BOYD.
GEAR SHIFTING MECHANISM FOR AUTOMOBILES AND THE LIKE.
APPLICATION FILED MAY 9, 1914.

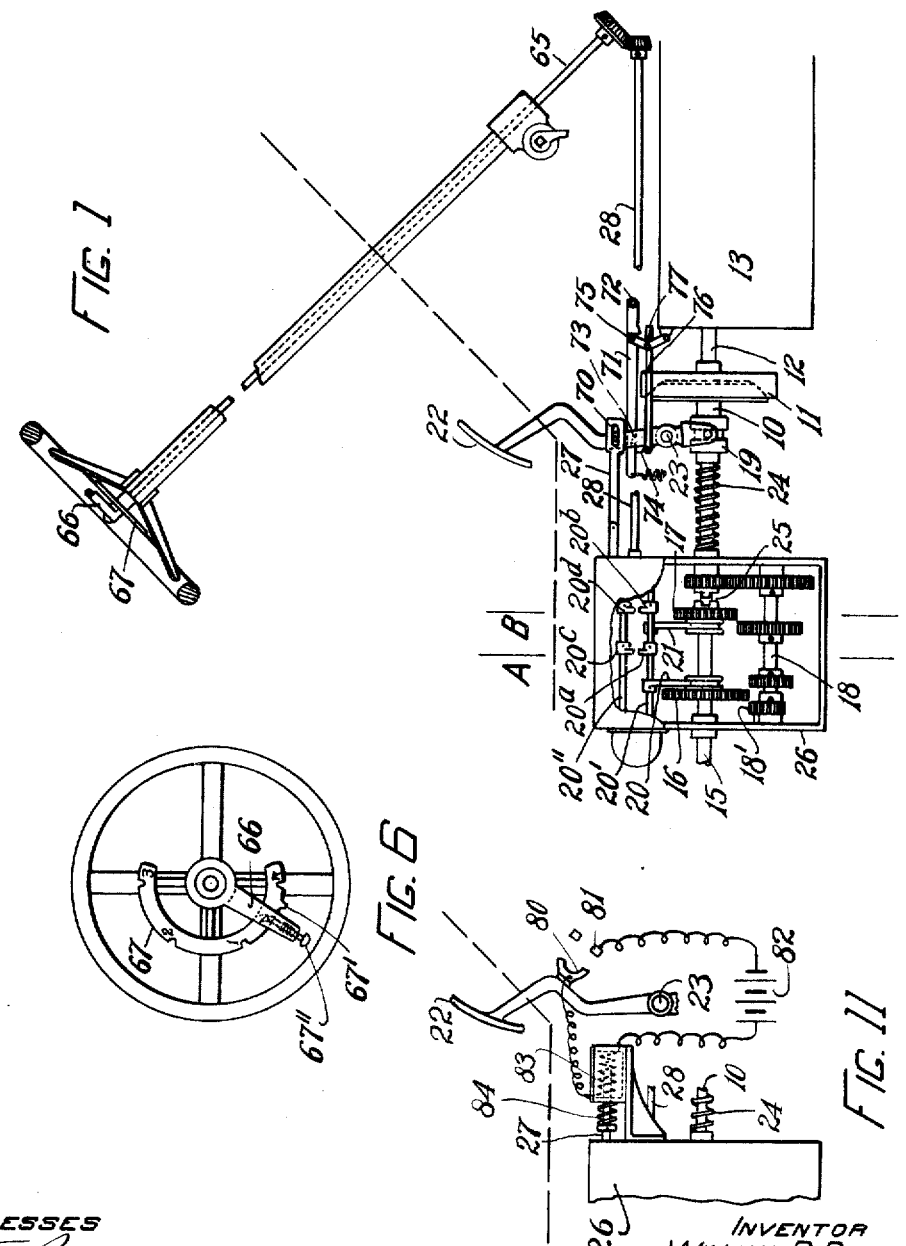

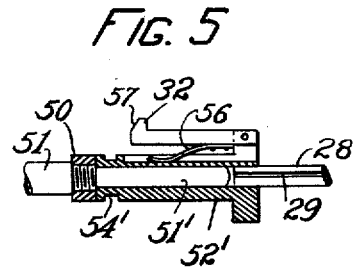
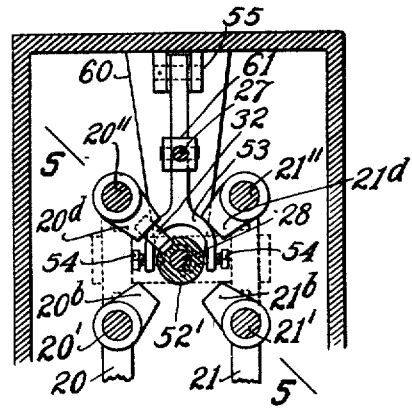
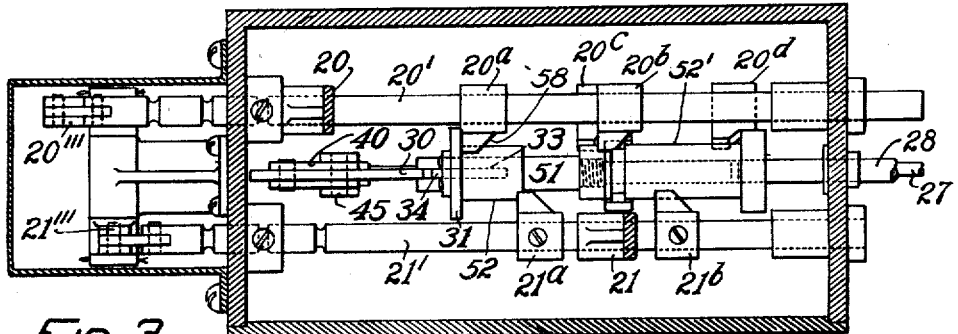
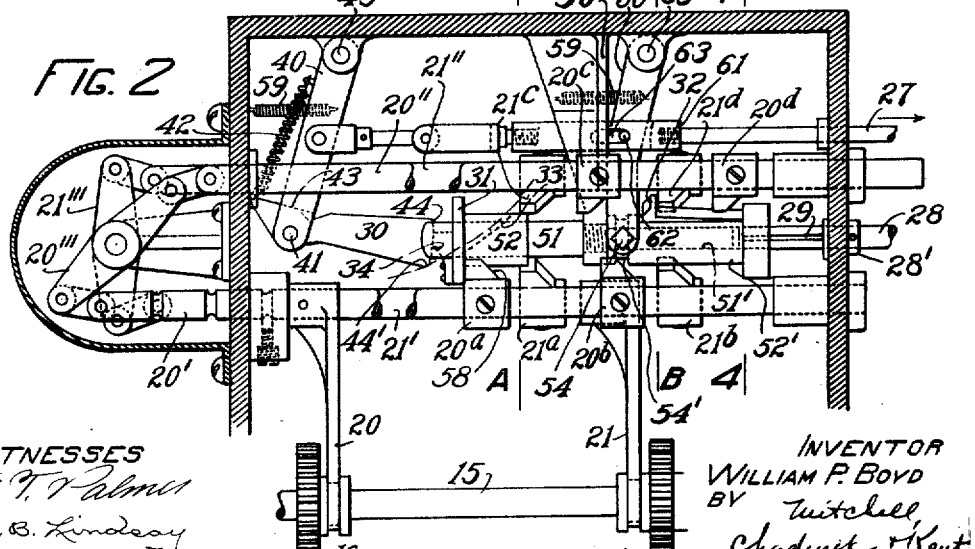

1,309,680.

Patented July 15, 1919.

WITNESSES

INVENTOR
WILLIAM P. BOYD
BY
Mitchell, Chadwick & Kent
ATT'YS.

UNITED STATES PATENT OFFICE.

WILLIAM P. BOYD, OF CAMBRIDGE, MASSACHUSETTS.

GEAR-SHIFTING MECHANISM FOR AUTOMOBILES AND THE LIKE.

1,309,680.   Specification of Letters Patent.   Patented July 15, 1919.

Application filed May 9, 1914. Serial No. 837,418.

*To all whom it may concern:*

Be it known that I, WILLIAM P. BOYD, a citizen of the United States, residing at Cambridge, in the county of Middlesex and State of Massachusetts, have invented new and useful Improvements in Gear-Shifting Mechanism for Automobiles and the like, of which the following is a specification.

This invention relates to improvements in selective shifting mechanism, especially suitable for use in gear shifting mechanism for automobiles, motor boats and the like. More particularly it relates to means by which the driver of the vehicle may indicate the particular combination of driving gears which he wishes to use and then may establish the combination by a single depression of a pedal, which may conveniently be the same pedal that operates the main clutch. Thus the invention eliminates the hand lever heretofore customary for changing gears, and the compressed air, electric or other power mechanisms that have been proposed for the purpose. The invention may be worked by means other than the main clutch pedal if desired, and is not limited to operation by the hand or foot of the operator, but may be operated by any suitable power mechanism.

The invention is illustrated as it may be applied to a power transmission system in which there are two sliding gears for varying the connections, but it may be applied to variations of this system and to other systems. It is among the objects of the invention to provide apparatus which is positive in action, in the sense that it is executed directly by the power applied; one in which the engaged gear, whichever it may be, is disengaged as a preliminary stage of the change; and one in which the continuation of the same pedal motion which has thus disengaged it sets whichever gear has been indicated in whichever of its positions has been indicated; the parts being automatically reset ready for another shift when the operator releases the pedal. Features of particular importance in this part of the invention are the means by which the gear that has been moved to its disengaged or "neutral" position is left there while the part propelling it continues its travel; and by which said part is reset in position to make another shift, notwithstanding that a gear in the meantime has been so set that its path is obstructed. This part of the invention is carried out by the use of a swinging arm having a spring mounted lug. The swinging of the arm pushes the gear; and the parts are so set that its arc of travel carries the lug out of engagement just when the gear has moved to its neutral position, so that it finishes with an idle stroke, while another part moving with it is setting the parts in the indicated gear position. On its return stroke the lug yields transversely against the spring, swinging past the part thus set until at the end of its return stroke the spring throws it automatically back transversely into engagement ready for the next active stroke. Another feature is the means by which the position of each gear is positively controlled so that if the gears are moved at all they are moved to the full extent of their proper motion and no more. Other features will appear from the following description and the accompanying drawings, which represent one embodiment of the invention. The patent, however, is not restricted to this particular embodiment but is intended to cover other embodiments within the scope of the appended claims; and it is intended by said claims to cover whatever features of patentable novelty exist in the invention disclosed. In the accompanying drawings:

Figure 1 is a side elevation, diagrammatic, showing the location and connections of the gear shifting mechanism whose details are shown in other views, as it may be applied in an automobile;

Fig. 2 is a side elevation showing the gear shifting mechanism, with the gear 16 in a different position;

Fig. 3 is a plan of the same;

Fig. 4 is an end elevation of the same, in section on the line 4—4 of Fig. 2;

Fig. 5 shows a detail on a larger scale in section on the line 5—5 of Fig. 4;

Fig. 6 is on an enlarged scale showing the head of the steering wheel and control for the gear shifting mechanism;

Fig. 11 is a diagrammatic side elevation of a modified way of applying the invention.

Figure 9:
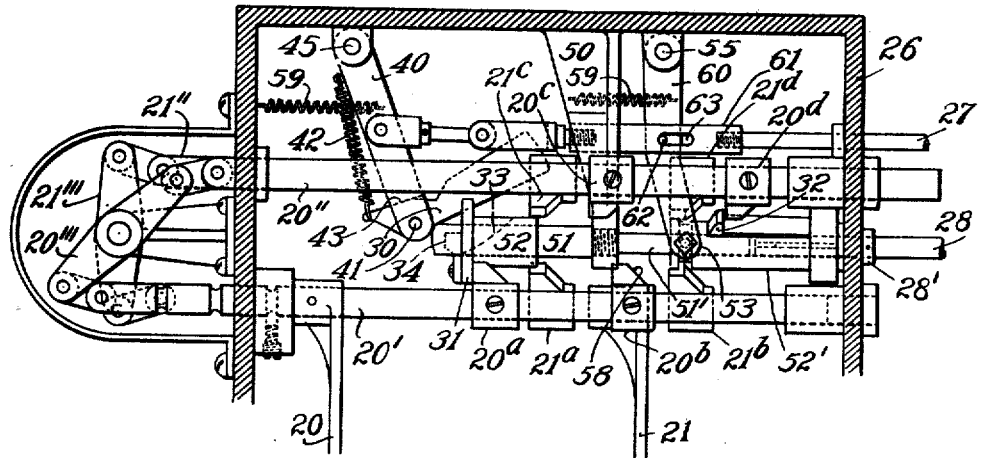
Fig. 9 is a side elevation showing the parts at the end of working stroke.

Referring to the drawings, 10 represents a section of the main transmission shaft of an automobile connected at one end by a clutch 11 to the shaft 12 of the engine 13 and at the other end extending into the box which contains the various gears for transmitting the power to the main driving shaft of the car. This transmission box may be of any suitable shape, and may contain gears variously arranged. It forms no part of the invention. The particular style chosen for illustration has two gears marked respectively 16 and 17 slidable separately on the main shaft 15 in order to make suitable engagement. Gear 16 is movable in either direction by an arm 20 and gear 17 by an arm 21, each of these arms being controlled by the mechanism herein to be described. The shaft 10 may carry the usual collar 19 by which, when moved by pedal 22, one member of the main clutch 11 is separated from the other. As illustrated, a forward and downward pressure of the operator on the pedal 22 turns the pedal about its pivot 23 so as to throw collar 19 backward against the pressure of spring 24 thus opening the clutch 11, while upon release of foot pressure the spring 24 throws collar 19 back and causes the clutch to be again closed or engaged. It is one purpose of the invention to provide means by which the simple act of depressing the clutch pedal 22 shall set either of the gears 16 or 17 in either direction as may have been predetermined by the operator. If the gear 17 be shifted to the right, Fig. 1, the dog-clutch 25 (one member of which is formed by the hub of the gear) will make a rigid connection between the shafts 15 and 10, so that the shaft 15 will be directly driven by the engine, gears 16 and 17 being otherwise disengaged. Movement of the gear 17 to the left will engage it with the largest driving gear on the jack shaft 18, the dog-clutch 25 being then disconnected, and the shaft 15 will be driven through the jack shaft 18 and gear 17. If the gear 17 be left in the position portrayed, and the gear 16 be moved to the right, the shaft 15 will be driven through the jack shaft, at a slower speed and with greater torque; while if the gear 16 be moved to the left it will engage with the gear 18' portrayed under the jack shaft, and will be driven therefrom in reverse direction, thus driving the shaft 15 reversely. The mechanism of the invention is intended to enable the operator to select and indicate any one of these gear positions without actually moving the gears, and then, at will, to set the gears in that position by pedal depression, or some other single power stroke.

In the particular application of the invention chosen for illustration important parts of the mechanism occupy a compact space in the gear box 26, the general arrangement being seen in Fig. 1.

The gear arm 20 is fast on one of a system of two sliding rods, 20' and 20", which move oppositely to each other because of their connection by a walking beam 20'''; and the gear arm 21 is likewise fast on a sliding rod 21' which is connected with an oppositely sliding rod 21" through another walking beam 21''', the latter system being mostly concealed from view by the former system as represented in Figs. 1, 2 and 9. Each of the four rods has two abutments, both facing in the same direction, by either of which it may be moved. In the arrangement illustrated these abutments are on lugs fast on the rods, and the rods themselves are arranged around a central operating mechanism, toward which the lugs project fixedly and radially. Said lugs, on the first mentioned system of rods, are $20^a$ and $20^b$, both on rod 20'; and $20^c$ and $20^d$, both on rod 20". Similar lugs $21^a$ and $21^b$ are on rod 21', while $21^c$ and $21^d$ are on rod 21". Movement of either lug $20^a$ or $20^b$ to the right, as they appear in the drawings, will move arm 20 to the right; while movement of either lug $20^c$ or $20^d$ to the right would move the same arm 20 to the left. In Fig. 2 this arm is represented in its extreme position to the left, as when gear 16 is engaged with gear 18'. The rods 21' and 21" are represented in their central position which corresponds to the neutral or disengaged position of the gear 17. When both arms 20, 21, are in their neutral positions (as in Fig. 1) the lugs just mentioned are assembled with their faces in two planes, one lug on each rod, to wit, $20^a$, $20^c$, $21^a$, $21^c$, being in plane A, and the other lug on each rod, to wit, $20^b$, $20^d$, $21^b$, $21^d$, being in plane B. Each lug is obviously capable of movement, with its rod, in either direction from its neutral plane.

Figures 7, 8:
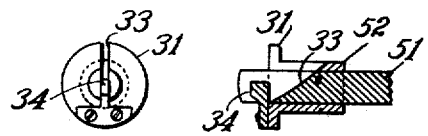
Fig. 7 is an end elevation, and Fig. 8 a side elevation, of a detail seen in Fig. 2.

The actuator consisting of the rod 27 and related parts, when put through its working stroke, by depression of pedal 22, first assembles all of these lugs with their abutments in their neutral planes, acting through the medium of a latch lug 30 and collector 31 upon one of the group $20^a$, $20^c$, $21^a$, $21^c$, (hereinafter called the neutralizing lugs) and immediately afterward by a continuance of its motion distributes them to the desired positions, acting to that end through the selector latch lug 32 upon one of the group $20^b$, $20^d$, $21^b$, $21^d$, (hereinafter called the shifting or distributing lugs). This is accomplished as follows: A post 50 rigidly supported on the frame of the box carries a fixed guide in the form of a stud 51 rigidly mounted centrally among and parallel to the four sliding rods. On this is a sliding block 52 carrying a disk lug or flange 31, comprising the collector, which projects enough and is suitably positioned to sweep all possible portions of the neutralizing lugs between their neutral plane, and the initial position of the actuator. The position of this flange is seen in Fig. 2, and the general construction is more clearly shown in Figs. 7 and 8 where it is also seen that the flange, sleeve and stud are cleft by a deep groove 33, which is wide enough to receive and guide the lug 30 hereinafter to be described. For engagement with that lug they carry an abutment 34 within the upper part of the cleft 33. This abutment is conveniently constructed by attaching a separate piece to the outer face of the flange 31. The collector block 52 is therefore adapted on one side to abut against either of the neutralizing lugs, and on the other side to abut against the latch lug 30 of the actuator. The latter is mounted on a swinging arm 40 to which it is pivoted at 41, being held by a spring 42 against a seat 43, so that normally it occupies the position projecting at right angles from the arm 40 which is illustrated in Fig. 2. The arm 40 is pivoted to the stationary frame at 45, so that when pulled by the rod 27 the face 44 of the latch lug 30 swings obliquely across the path of abutment 34, through a path indicated by the dotted arc in Fig. 2 which shows the line of travel of the outmost corner 44' of this lug face 44. The faces 44 and 34 are preferably formed on a curve so that the face 44 can slip easily over the face 34 as the curved path of the former draws it gradually out of the rectilinear path of the latter; and the corner 44' of the lug 30 is preferably slightly rounded to avoid excessive wear. Consequently, when the rod 27 is pulled in the direction which is to the right in Fig. 2, the lug 30 pushes in the same direction the abutment 34; flange 31 and whatever one of the group of neutralizing lugs 20ᵃ, 20ᶜ, 21ᵃ, 21ᶜ, happens to be to the left of its neutral plane A. This continues until the abutment 44 has moved transversely enough to clear the abutment 34; and the apparatus should be designed so that this clearance occurs when all four of the said neutralizing lugs have their faces in their neutral plane A, at which time both gear arms 20, 21, and their gears 16, 17, are in disengaged or neutral position, as illustrated in Fig. 1, and the four shifting lugs are assembled with their abutment faces in plane B. As the rod 27 continues its motion, the cleared lug 30 meanwhile swinging idly onward, the selector latch lug 32, comes immediately into action to execute the desired gear engagement or "shift." On the same axis with stud 51 the stationary post 50 carries another stud 51', which may conveniently be made integral with the stud 51, and on which is mounted slidably a sleeve 52', carrying the selecting latch lug 32. This sleeve is moved to and fro by means of a yoke 53 having pins 54, Fig. 4, which engage in a groove 54', the yoke being on the end of a swinging arm 60 which is pivotally mounted on the stationary frame at 55 and which is engaged with the rod 27 by a pin and slot connection that is best seen in Figs. 2 and 4. This connection, as illustrated, consists of a square block 61 on the rod 27 through which block the arm 60 passes in a suitable slot. The block has lateral longitudinal slots 63 into which the pins 62 project from the arm 60 and these slots 63 are so formed and located as to provide lost or idle motion for the rod 27 so far as the arm 60 is concerned during the initial part of its movement, and until it has pulled the arm 40 far enough for the face 44 of the lug 30 to clear the abutment 34 of the sleeve 52, all the neutralizing and all the distributing lugs being then in their respective neutral planes. The parts should be designed so that the end of slot 63 which is represented at the left in Fig. 2 shall reach and engage the pins 62 immediately thereafter. The further movement of the rod 27 draws the arm 60, carrying with it the sleeve 52', the latch lug 32, and whichever of the distributing lugs 20ᵇ, 20ᵈ, 21ᵇ, 21ᵈ, it has been set to select. This latch lug is designed so that it projects far enough radially from the axis 51' to engage any one of those lugs, and narrow enough to pass between them without engaging any one. The question which one is to be engaged, if any, is determined by the angular position of the latch lug 32 about the axis 51'. Means is provided for the operator to control that position at will. This means, as represented, consists of a rod 28, rotatable in a bearing 28' and attached to the end of sleeve 52' non-rotatably by any suitable means, 29. The other end of this rod 28, seen in Fig. 1, is connected through suitable gearing with a controlling and indicating device, located in any position that is convenient to the driver of the car, and designed and operated in any convenient way. As represented, this controlling and indicating device consists of a light shaft or tube 65 passing centrally through the steering post and equipped with indicator handle 66 moving over a segment 67 on which are marked various positions corresponding to the positions of the selector 32 when toward the various distributing lugs 20ᵇ, 20ᵈ, 21ᵇ, 21ᵈ, while another mark is placed to correspond to a position of the selector 32 midway between some two of those positions. For convenience these positions may be marked according to the popular way of referring to the different gear combinations, the letter R indicating a gearing connection for driving backward; N, gearing disengaged, or in neutral position; and 1, 2, and 3, gearing for the various speeds forward. For protection against the operator's throwing the gearing into the reverse position unintentionally, an obstruction 67' may be provided on the segment, which may be passed by pulling out a spring-held button 67″ on the indicator handle.

The latch lug 32 has a spring 56 which keeps it normally pressed outward but allows it to yield inward. It has a beveled back 57, and the lugs of this group also have beveled backs 58, so that the latch lug 32 when moving to the left in Fig. 2 can pass one of those lugs, even though it be in the same line with it. Suitable springs 59 are provided for setting the arms 40 and 60 automatically in the positions illustrated in Fig. 2 and holding them there yieldingly; and suitable joints 59′ are provided in the rod 27 to allow for the variation between the rectilinear and the curvilinear motion which different parts of it have.

In operation, the entire function, of disengaging the main clutch, disengaging whichever gear 16 or 17 happens to be in mesh in the transmission box, making whatever other gear connection has been indicated by the operator at 66, re-setting the apparatus ready to effect another gear shift, and reëngaging the main clutch, is executed by single complete depression and release of the pedal 22. The initial movement of the pedal 22, turning about its pivot 23 pushes the sleeve 19 to the left, as represented in Fig. 1, against the main clutch spring 24, thus opening the clutch 11 while the gears 16, 17, remain fully engaged. This is because the connection of the pedal lever to the rod 27 has a certain amount of lost motion, as indicated at 70, so that the driver can open and close his main clutch at will, by a slight depression of the pedal, without disturbing the gearing connections. Upon a complete depression, however, the rod 27 presently becomes engaged at 70 and is pulled to the right for its working stroke. Its initial movement, acting through lug 30, pushes flange 31 and so picks up and pushes along whatever of the neutralizing lugs is to the left of its plane A (20$^a$ as illustrated), until all four of those lugs are in their neutral plane A. Incidentally the distributing lugs being connected therewith through the system of rods are also drawn to their neutral plane B. This position is illustrated in Fig. 1. During this movement the lug 30 has been pushing the abutment 34 and at the same time sliding transversely upon it so that it clears that abutment just as the said neutral position is reached; and the pins 62, past which the rod 27 has been sliding idly because of the slot 63, are immediately afterward reached by the end of that slot, picked up and thereafter carried along by the rod 27, taking with them the arm 60, the sleeve 52′, the latch 32, whatever one of the distributing lugs the latch is in position to engage, and with the latter one of the sliding rods, shifting its arm 20 or 21 in either the same or the opposite direction according to whether it is connected thereto either directly or through the walking beam. This movement goes far enough to make and complete the desired engagement of either gear 16 or 17. The same movement, acting through the walking beam has drawn one of the neutralizing lugs to its limit of distance from its neutral plane A in the opposite direction, carrying with it the flange 31 and abutment 34, and the distributing lug which is rigid on the same rod has necessarily moved equally far out of its neutral plane B. This is possible, because the lug 30, having cleared the abutment 34, has passed transversely out of the way. This position is illustrated in Fig. 9. When the pedal 22 is released the main clutch spring 24 throws the rod 27 back toward its initial position; and the springs 59 complete its movement, taking up the lost motion at 70 and at 63 and thus carrying the latch lugs 30 and 32 back. Immediately after lug 30 clears the abutment 34 on its working stroke, that abutment begins moving backward, and so the lug 30 could not execute its return stroke were it not for that feature of the invention which introduces the latch idea. According to this feature the lug 30 has a pivot support at 41, and a spring 42 against which it can yield transversely on its backward swing, and so can pass the abutment 34 and snap into working position behind it. On its forward movement the frictional drag as the abutment 44 slides transversely over abutment 34, while pushing it longitudinally, tends to keep the lug pressed against the seat 43; and hence the forward action is positive.

The construction of the means for operating the distributing or shifting lugs overcomes another mechanical difficulty which would otherwise make a structure of this type futile, and constitutes an important feature of the invention. It may happen that the operator will wish to shift the gears in a way that requires lug 32 to engage one of the distributing lugs which at the moment stands behind it, as for example, the lug 20$^b$, when in the position represented in Fig. 2. This situation is met by those features of the invention which provide, first, that all of the distributing lugs shall be returned to their neutral plane B; and second, a latch by which the actuating and distributing lugs can pass each other if they happen to be in the same line, in order for the latter to reach the position where it can be engaged by the face of the former. While the latch is here represented as being on the single central lug, 32, it is not necessarily there but might be applied to either of the two lugs which pass each other. And so, likewise, the latch operating with respect to the abutments 34 and 44 might be applied to either.

Although the invention is shown as it may be applied to automobiles, it is not limited to that, nor indeed is it limited to the shifting of gears only, but may be applied to effect any purpose which involves the selective shifting of one or more elements 20', 21', to which anything, such as gear moving arms, 20, 21, may be attached. The number of elements thus controlled may be multiplied at will by multiplying the number of systems of sliding rods around the central operating mechanism, the two systems here shown being sufficient to illustrate the principle. And while the invention is here represented as adapted for operation by the pressure of a human operator upon a pedal, it will be obvious that it might be attached to any other appliance, and might be operated by other power. In the latter case, if operated by air or electric power, only a single cylinder or solenoid will be required, in place of the multiplicity of cylinders or solenoids used by some existing systems, because the execution of the indicated shaft is effected by a single stroke of the single lever 22, and that stroke is always in the same direction. Fig. 11 illustrates this.

Figure 10:
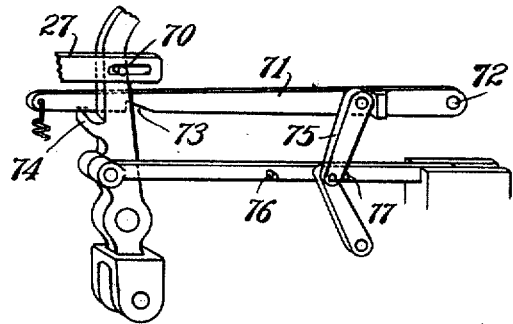
Fig. 10 is an enlarged view of details shown in Fig. 1.

A further feature of the invention, which is useful when the invention is applied to automobiles, and especially when worked by foot power, is illustrated in Figs. 1 and 10 of the drawing, for the purpose of preventing the operator from inadvertently dislodging the gears when intending only to open and close the main clutch. This feature of the invention works in conjunction with the slot 70, and provides that if the operator depresses the pedal 22 far enough to start the gears out of the position they are occupying at the time, he cannot reëngage his clutch until he has made a complete reengagement of the gears, which he does by making a full stroke of the pedal 22. The gears will then be fully disengaged and immediately returned to the same position which they were in (unless the indicator 66 has been changed). The arrangement of parts in Fig. 2 represents a situation in which this will happen, the latch lug 32 coming into engagement with the distributing lug 20ᵈ. The mechanism for accomplishing this purpose may take various forms but as here illustrated it comprises a lever 71 pivoted at 72 and having a notch 73 on its under side near its free end adapted to fall like a keeper on a spur 74 on the clutch lever, and prevent the return of the clutch lever 22, if that lever be pressed far enough; and this is so located that it effects such engagement at the point where the clutch lever 22 reaches the end of slot 70 and begins to move the shifting rod 27. The lever 71, near its pivot, may be supported by a toggle joint 75, which is placed so as to be engaged by a pin 76 on an auxiliary rod moving with the lever 22 and rod 27 in order that when the rod 27 reaches the end of its stroke the part 76 shall strike and straighten the toggle, thereby lifting the lever 71, and holding it up while the return stroke is effected. A pin 77 is so placed as to engage and collapse the toggle after the spur 74 has passed the notch 73 on the return stroke, and so to set it for another operation. Consequently, if the rod 27 be moved at all, the notch 73 prevents reëngagement of the main clutch until the rod has been moved through its complete stroke, because only so can the toggle 75 be straightened to lift the notched lever 71.

Fig. 11 shows a modification by which the shifting apparatus may be actuated by power, electrical power being chosen for illustration. In such case there is less reason to use the mechanism illustrated in Fig. 10, and that is omitted. In the particular manner in which this modification is portrayed, the clutch pedal lever 22 carries one terminal or contact point 80, which may be a spring, adapted to engage another terminal or contact point 81 of an electric circuit when the clutch lever 22 is depressed to its extremity of travel. The current may be derived from any suitable source, represented in this case as a battery 82, and passes through a solenoid 83 which pulls the rod 27, and so actuates the shifting mechanism. A spring 84, strung on the rod 27 so as to be compressed by this motion, returns the rod 27 to its initial position whenever the pull of the solenoid ceases. This normally occurs upon the release of the clutch pedal 22, at which time the main clutch spring 24 swings it back so as to break the contact between terminals 80 and 81. Fig. 11 is to be considered merely as a diagram illustrating a simple way in which the shifting device may be operated by electric power instead of by foot power. Of course it is not essential that the contacts 80, 81 be arranged in combination with the clutch lever; and many variations may be made, according to the needs or preference of the designer, and depending upon whether the device is used on an automobile or in some other connection.

I claim as my invention:

1. A selective shifting mechanism including in combination one or more shiftable elements, an oppositely moving element interconnected with each; two abutments on each element, adapted for engagement with an actuator, the said elements being arranged so that half of said abutments, including one on each element, may concurrently be in a neutral plane, and the other half simultaneously in another neutral plane; said actuator having a working stroke continuous in one direction, initially returning to one plane any abutment displaced therefrom, and terminally displacing an abutment from the other plane; and means to select the abutment that is to be displaced.

2. A selective shifting mechanism, including in combination one or more shiftable elements; an oppositely moving element interconnected with each; an actuator having a working stroke continuous in one direction; a neutralizing abutment on each element, movable therewith between an initial position corresponding to the actuator's initial position and a neutral position where all of said abutments register together in a plane; means whereby the said actuator sweeps all of said abutments between initial and neutral and clears them at said plane, permitting immediate return of any; and a selector for predetermining a single element to be engaged and shifted by further movement of the actuator.

3. A selective shifting mechanism including in combination one or more shiftable elements, an oppositely moving element interconnected with each; actuating means adapted by preliminary movement to set the elements in neutral position; abutments for shifting the elements, one fast on each element, registering together in a single plane when the elements are in said neutral position; and a lug movable in said plane to a position opposite any one of said abutments, thereby selecting its element for shifting; the whole being adapted and arranged for the said lug to return to and remain in said plane after each shifting and until the next shifting, the actuating means being adapted to engage by its later movement and to move said lug and selected abutment and element.

4. A selective shifting mechanism, including in combination one or more elements shiftable by rectilinear sliding; an oppositely sliding element interconnected with each; a stud to which said elements are parallel and around which they are arranged; abutments, one on each element, movable to and from a neutral position; a lug, adjustable around said stud to a position toward any one of said abutments and adapted to engage it when it is in neutral position; and an actuator, having a working stroke continuous in one direction, initially setting said elements in neutral position, and terminally engaging said lug, and through it the selected abutment and element, to shift them.

5. A selective shifting mechanism, including in combination one or more shiftable elements, an oppositely moving element interconnected with each; abutments for shifting the elements, one fixed on each; said abutments registering together in neutral position and being movable thence in both directions, a lug adjustable into line with any one of said abutments and adapted to engage such abutment when in neutral position to press it in one direction, one of these parts being adapted to yield for the abutment to reach neutral position from the opposite direction; an actuator and means whereby it initially moves the abutments to neutral position and terminally moves said lug and selected abutment to shifting position on a continuous working stroke.

6. A parallel movement shifting mechanism including in combination one or more elements, shiftable by rectilinear sliding; an oppositely sliding element interconnected with each; a selecting device, adjustable transversely to the direction of sliding to select one of said elements; an actuator moving parallel to said elements, for shifting them; a motor, with clutch and shiftable gears in the power transmission line therefrom, the clutch having a member sliding parallel to the actuator, each shiftable gear sliding parallel to said sliding elements and being attached to one of the oppositely moving pairs of elements; a control lever for use of the operator, connected with said clutch and actuator and moving in a plane to which their motion is parallel, and means whereby the actuator engages different single elements in different parts of a single one-way stroke.

7. A selective shifting mechanism, including in combination one or more elements shiftable on parallel courses; an oppositely moving element interconnected with each; a neutralizing abutment on each element; all the neutralizing abutments being movable into registry together in a neutral plane; a fixed guide to which said elements are adjacent and parallel; a block movable on the guide, adapted to sweep positions of all of said abutments and carry them to the neutral plane; an actuator, pushing the block toward said neutral plane and there clearing it to permit its immediate return; and means whereby the further motion of the actuator shifts a selected element causing return of the block.

8. A selective shifting mechanism, including in combination one or more shiftable elements; an oppositely moving element interconnected with each; a neutralizing abutment fixed on each, these abutments being arranged to come into registry together; a loosely mounted assembly block adapted on one side to engage any of the abutments, to assemble them in registry; an abutment on the other side of the block; and an actuator adapted to engage the latter, and through it to engage and actuate any of said neutralizing lugs; and means to select and distribute said elements from the neutral position.

9. A selective shifting mechanism, including in combination one or more elements, shiftable on parallel courses; an oppositely moving element interconnected with each; a neutralizing abutment on each element, all the neutralizing abutments being movable into registry together in a neutral plane; a collector block sliding parallel to said elements, an actuator, including a lever adapted to push said block, carrying any abutment to said neutral plane; and a guide on which externally said block slides, having internally a cleft in which said lever moves.

10. A selective shifting mechanism including in combination one or more elements shiftable on parallel courses; an oppositely moving element interconnected with each; a neutralizing abutment and a shifting abutment on each element; a guide, around which the said elements are arranged; a collector adapted to slide on the guide and engage any neutralizing abutment; a selector adapted to turn on the guide and select one of the shifting abutments; and an actuator having two actuating lugs, one acting first through said collector and the other afterward through said selector.

11. A selective shifting mechanism, including in combination one or more shiftable elements; an oppositely moving element interconnected with each; a neutralizing block adapted to move said elements in one direction or be moved by them in the opposite direction; an actuator adapted to engage said block; and means guiding the actuator obliquely with respect to the block, thereby clearing the block at the end of the neutralizing stroke; means for thereupon executing the shifting stroke and returning the neutralizing block to initial position; and means whereby the actuator thereafter returns idly to initial position, there being a yielding support permitting it to pass and engage behind said neutralizing block.

12. A selective shifting mechanism, including in combination one or more shiftable elements; an oppositely moving element interconnected with each; a neutralizing abutment and a shifting abutment on each element; and an actuator having a continuous stroke in one direction, adapted to engage both kinds of abutments, there being, in the device for engaging each kind, provision for lost motion of the actuator while the other kind is engaged.

13. A selective shifting mechanism, including in combination one or more shiftable elements; an oppositely moving element interconnected with each; a motor, with clutch and shiftable gears in its power transmission line; an actuator having a working stroke continuous in one direction and means whereby during said stroke it disengages and reëngages said gears; an operator's lever, interconnected with said clutch and actuator and provided with lost motion, whereby it initially operates the clutch and not the actuator; and a latch adapted to engage said lever at the end of said lost motion and prevent its return; means at the end of complete stroke to open the keeper of the latch to permit the return and means to re-set the latch upon the return.

14. A selective shifting mechanism, including in combination one or more shiftable elements; an oppositely moving element interconnected with each; a motor, with clutch and shiftable gears in its power transmission line; an actuator having a working stroke continuous in one direction and means whereby during said stroke it disengages and reëngages said gears; an operator's lever, interconnected with said clutch and actuator and provided with lost motion, whereby it initially operates the clutch and not the actuator; and a latch adapted to engage said lever at the end of said lost motion and prevent its return; a toggle joint adapted to withdraw the keeper; means moving with the operator's lever to operate the toggle at the end of stroke, and to collapse the toggle at the end of return, thereby re-setting the latch.

15. A selective shifting mechanism, including in combination one or more elements, comprising rods, shiftable endwise; an oppositely sliding rod interconnected with each; lugs on the rods for moving them; said lugs being fast to and projecting from said rods intermediate of their respective lengths; a collector and a selector sliding parallel to said rods, and adapted to engage said lugs; and an actuator for moving said collector and selector successively.

16. A selective shifting mechanism, including in combination one or more elements comprising rods shiftable endwise; an oppositely sliding rod interconnected with each; a stationary guide around which said rods are assembled; blocks slidable on said guide; lugs on said rods; lugs on said blocks adapted to engage said rod-lugs to move the rods; one of said blocks being a collector, covering every rod-lug position, to neutralize the rods; and the other block being a selector, covering only one rod-lug position; means for the operator to rotate said selector to select one rod that is to be shifted; and an actuator adapted to move the blocks successively.

Signed by me at Boston, Mass., this seventh day of April, 1914.

WILLIAM P. BOYD.

Witnesses:
EVERETT E. KENT,
JOSEPH T. BRENNAN.